United States Patent
Keshavamurthy et al.

(10) Patent No.: US 10,739,147 B2
(45) Date of Patent: Aug. 11, 2020

(54) HIERARCHICAL ROUTE GENERATION, PROVISION, AND SELECTION

(71) Applicant: TOYOTA JIDOSHA KABUSHIKI KAISHA, Toyota-shi, Aichi-ken (JP)

(72) Inventors: Shalini Keshavamurthy, Sunnyvale, CA (US); BaekGyu Kim, Cupertino, CA (US); Kentaro Oguchi, Menlo Park, CA (US)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 78 days.

(21) Appl. No.: 15/951,142

(22) Filed: Apr. 11, 2018

(65) Prior Publication Data
US 2019/0316919 A1  Oct. 17, 2019

(51) Int. Cl.
G01C 21/34 (2006.01)
G08G 1/0968 (2006.01)
G08G 1/0969 (2006.01)

(52) U.S. Cl.
CPC ....... *G01C 21/3415* (2013.01); *G08G 1/0969* (2013.01); *G08G 1/096844* (2013.01)

(58) Field of Classification Search
USPC .......................................................... 701/533
See application file for complete search history.

(56) References Cited

U.S. PATENT DOCUMENTS 4,311,876 A * 1/1982 Endo ...................... H04B 1/662
340/905
8,825,395 B2  9/2014 Boss et al.
10,416,980 B2 * 9/2019 Chao ........................ G06F 8/65
2007/0168524 A1 * 7/2007 Chao ........................ G06F 8/65
709/228
2010/0063720 A1 * 3/2010 Machino ............ G01C 21/3658
701/533

(Continued)

FOREIGN PATENT DOCUMENTS

| EP | 1202028 A1 | 5/2002 |
| JP | 2006313126 A | 11/2006 |
| WO | 2009065637 A1 | 5/2009 |

OTHER PUBLICATIONS

"The Best Traffic Apps for Android and iOS," https://www.compare.com, Oct. 31, 2017 (8 pages).

*Primary Examiner* — Tyler D Paige
(74) *Attorney, Agent, or Firm* — Patent Law Works LLP

(57) ABSTRACT

An example method receives sensor data of a vehicle at a localized server associated with a particular geographic region that has one or more roadway segments. The vehicle is located in the particular geographic region. The method analyzes the sensor data to determine one or more of a localized lane option and a localized path option for navigating the vehicle and provides the one or more of the lane and the path for navigating the vehicle to a centralized server executing a route planer. The centralized server has data covering a plurality of geographic regions. The method determines a centralized route option including one or more of the localized lane option and the localized path option and provides the centralized route option including the one or more of the localized lane option and the localized path option to a guidance selector of a navigation application of the vehicle for processing.

20 Claims, 9 Drawing Sheets

(56) References Cited

U.S. PATENT DOCUMENTS

| | | | |
|---|---|---|---|
| 2010/0211304 A1* | 8/2010 | Hwang | G01C 21/3484 |
| | | | 701/532 |
| 2013/0204524 A1* | 8/2013 | Fryer | G01C 21/3407 |
| | | | 701/527 |
| 2013/0204528 A1* | 8/2013 | Okude | G08G 1/096822 |
| | | | 701/533 |
| 2014/0309815 A1* | 10/2014 | Ricci | H04W 4/21 |
| | | | 701/2 |
| 2017/0069209 A1 | 3/2017 | Beaurepaire et al. | |
| 2017/0076600 A1 | 3/2017 | Scofield | |
| 2017/0276504 A1* | 9/2017 | Lu | G01C 21/3415 |
| 2018/0245938 A1* | 8/2018 | Song | G01C 21/3492 |

* cited by examiner

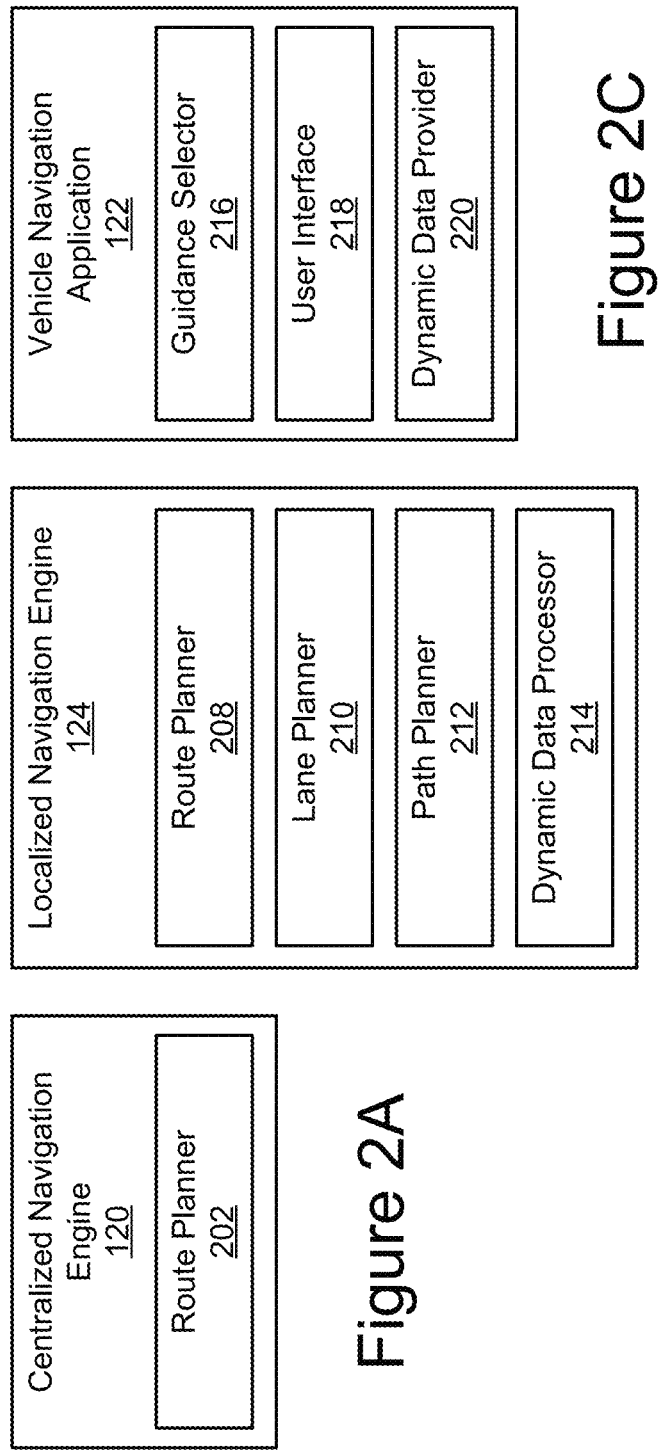

HIERARCHICAL ROUTE GENERATION, PROVISION, AND SELECTION

BACKGROUND

The present disclosure relates to vehicle navigation.

In-vehicle navigation technology, such as GPS-based navigation units, has become increasingly ubiquitous, and provides drivers with directions, area information, and real-time vehicle location information. This navigation information is often provided via an in-dash navigation unit, a third-party navigation unit, and/or a portable electronic device, such as a driver's mobile phone.

In some cases, various navigation applications may utilize the geolocation functionality of the device to provide the user with mapping and traffic information. These applications, like Google Maps™, Waze™, TomTom™, etc., assist in providing route options to the users, and in some cases, provide alternate routes for the user in case of situations like congestion or roadblocks. These navigation applications send information to a central server which accumulates data from many instances of the application to provide updates. However, communication to and from a central server directly often results in a less-up-to-date routing information due to network issues and expensive data processing needed to process the amount of data being received for a myriad of locations from a numerous application instances (e.g., hundreds of thousands, millions, etc.).

This results in existing technologies often lacking the real-time data needed to optimally and dynamically update navigation routes being traveled by users. Often, there is a significant lag between what is occurring on the roadway and the data reflecting the roadway state being processed by the navigation server that calculates the navigation routes that are provided. This is caused, at least in part, by the ever-changing state of roadways and traffic. Poor data quality, due to poor or non-existent connectivity, older unconnected vehicles, and roadways that lack intelligent infrastructure, also contribute to the problem.

Because the central server often does not have the latest information, the routes that are provided by it often do not reflect what quicker and/or more efficient options might be available. Routing information and other instructions received by the vehicles from the central server is generally outdated by the time it is processed by the vehicle, or may initially be generated by inaccurate heuristics modeled on historical averages due to the lack of current data. As a result, significant delays and obstacles exist in obtaining the latest traffic and/or roadway information, which prohibits better routes from being provided during the travel. Often, using these solutions, even when an optimal route is selected and utilized, it does not remain optimal during the travel due to the ever-changing state of the roadway (e.g., changes in traffic, weather, vehicle position, etc.).

While some existing solutions, such as those described by World Intellectual Property Office Publication No. WO 2009065637, U.S. Pat. No. 8,825,395, or European Patent No. EP 1202028, consider user preferences, they fail to do so in conjunction with dynamic changes occurring on during travel. As a result, route computations based on partially available data is inefficient and fail to fully benefit drivers.

SUMMARY

The subject matter described in this disclosure overcomes the deficiencies and limitations of the existing solutions by providing novel technology that, in some embodiments, include hierarchical server architecture to compute multiple paths and routes using multiple servers with different information resolution. These paths and routes are sent to the user and then can be chosen based on user preferences, action criteria, and type of vehicle.

In one innovative aspect, a method may comprise receiving sensor data of a vehicle at a localized server associated with a particular geographic region that has one or more roadway segments; analyzing the sensor data to determine one or more of a localized lane option and a localized path option for navigating the vehicle; providing the one or more of the lane and the path for navigating the vehicle to a centralized server executing a route planer; determining a centralized route option including one or more of the localized lane option and the localized path option; and providing the centralized route option including the one or more of the localized lane option and the localized path option to a guidance selector of a navigation application of the vehicle for processing. The centralized server has data covering a plurality of geographic regions and the vehicle is located in the particular geographic region.

In general, another innovative aspect may include a method comprising: receiving sensor data of a vehicle at a localized server associated with a particular geographic region that has one or more roadway segments; generating, at the localized server, one or more localized navigation route options using the sensor data of the vehicle; generating, at a centralized server, one or more navigation route options; providing the one or more localized navigation routes and the one or more centralized navigation routes to a guidance selector of the vehicle navigation application executing on board the vehicle; selecting, via the guidance selector, a particular route to follow the vehicle being located in the particular geographic region. The centralized server is distinct from the localized server and remotely located from the localized server, and the vehicle is located in the particular geographic region.

In general, another innovative aspect of the subject matter described in this disclosure may be embodied in systems comprising: one or more processors; one or more memories storing instructions that, when executed by the one or more processors, cause the system to perform operations comprising: receiving sensor data of a vehicle at a localized server associated with a particular geographic region that has one or more roadway segments; analyzing the sensor data to determine one or more of a localized lane option and a localized path option for navigating the vehicle; providing the one or more of the lane and the path for navigating the vehicle to a centralized server executing a route planer; determining a centralized route option including one or more of the localized lane option and the localized path option; and providing the centralized route option including the one or more of the localized lane option and the localized path option to a guidance selector of a navigation application of the vehicle for processing. The centralized server has data covering a plurality of geographic regions and the vehicle is located in the particular geographic region These and other implementations may each optionally include one or more of the following features: that the centralized route option includes the lane option and the path option; selecting at the vehicle to follow the centralized route option including the one or more of the localized lane option and the localized path option; providing turn-by-turn instructional guidance via a navigation application to a driver; severing a connection between the localized server from the vehicle responsive to the vehicle leaving the geographic region; establishing a connection between a second localized server and the vehicle responsive to the vehicle entering a region associated with the second localized server; determining, by the second localized server using a second set of sensor data received from the vehicle, a new path option for the centralized route; providing the new path option for the centralized route for display in a graphical user interface; receiving a selection to update the centralized route to use the new path option; and updating the centralized route to use the new path option; that the localized server is an edge server; that the edge server is a roadside unit; providing the one or more localized navigation routes and the one or more centralized navigation routes for display in a graphical user interface; receiving a selection to follow the particular route; providing turn-by-turn instructional guidance via a navigation application to a driver; that the vehicle is an autonomous vehicle; automatically determining that the particular route is a most efficient route to follow; controlling the vehicle using one or more actuators of the vehicle based on the particular route; responsive to leaving the geographic region, changing to a second localized server associated with a second geographic region district from the geographic region; determining, by the second localized server using a second set of sensor data received from the vehicle, a new path option; providing the new path option for display in a graphical user interface; receiving a selection to update the particular route to use the new path option; and updating the particular route to use the new path option; that the edge server is a roadside unit.

Other implementations of one or more of these and other aspects include corresponding systems, apparatus, and computer programs, configured to perform the actions of methods, encoded on non-transitory computer storage devices.

The novel technology for data transmission in vehicle context presented in this disclosure is particularly advantageous in a number of respects. For example, the technology described herein is capable of utilizing a server system comprising a hierarchical server network for computing optimal paths and routes. Route computation may be distributed across the network between multiple servers having different proximity to the vehicles, which enables a more scalable system that can update the driver with the route information more quickly and effectively than prior solutions. Advantageously, data traffic on the communication network may be reduced, such that the bandwidth provides for quicker, more reliable, and less latent message transfers between the servers and between the servers and vehicles. Further, the data utilized to compute routes by the server system is more up-to-date than prior solutions, and thus the routes computed have higher fidelity (are more accurate, are more frequently updated to reflect current conditions, etc.). This helps to ensure that drivers and/or autonomous control systems have the best possible route information, which results in a better, more efficient travel experience.

Further example benefits include that the technology considers many diverse types of important and relevant data (traffic history, user preferences, dynamic data, current traffic conditions, etc.) in making the route decisions; fine grained lane and path information are included in the route computations yielding more accurate and efficient routes; quick optimal route updates may be provided; workload may be efficiently distributed; and messages and notifications may be transmitted more quickly due to closer proximity between vehicles and servers.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

The invention is illustrated by way of example, and not by way of limitation in the figures of the accompanying drawings in which like reference numerals are used to refer to similar elements.

FIGS. 2A-2C are block diagrams of an example centralized navigation engine, an example localized navigation engine, and a vehicle navigation application.

DESCRIPTION

The technology described herein utilizes a hierarchical server system having a hierarchical server architecture to distribute the computation of path and route information. For example, the hierarchical server architecture may comprise localized servers and centralized servers. The localized servers may be situated proximate roadways being traversed by vehicles. The vehicles collect sensor data. The sensor data of a given vehicle may describes one or more vehicle dynamics of the vehicle for a given point in time and location. The vehicle data may further include, or may be processed to generate, environment data describing the environment surrounding the vehicle. The processed vehicle data of each vehicle may be transmitted by the vehicle to the server system, which uses the data as dynamic map data. Using the dynamic map data and digital maps, and in some cases user preference data and/or other signals, the localized and centralized servers may respectively compute an optimized set of routes and send the route data to the vehicles. The route data may be selectively displayed based on the user criteria in some cases. For example, a select number of the most optimal routes may be displayed or a most optimal route may be selected and automatically used for navigation.

Figure 1A:
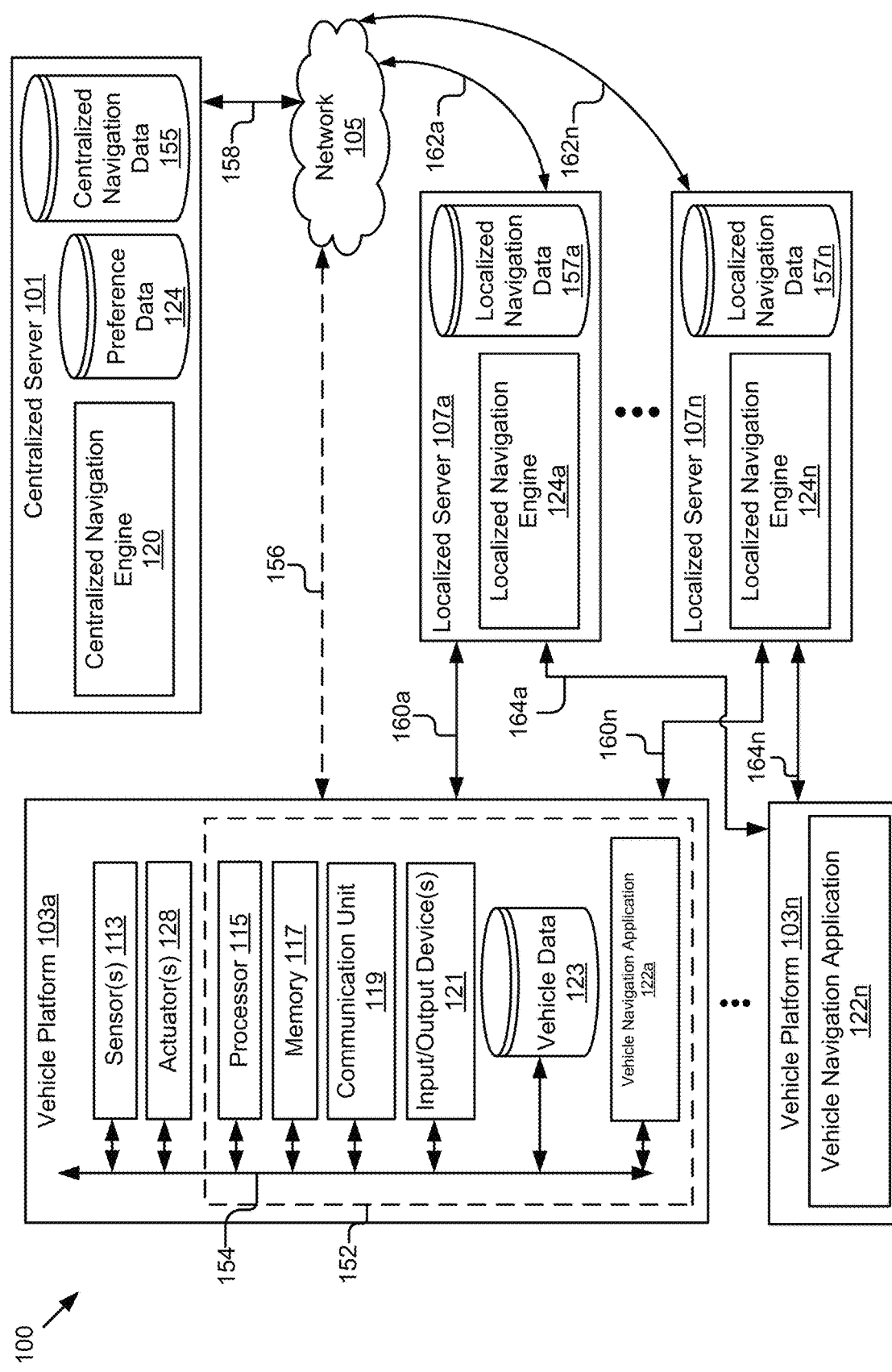
FIG. 1A is a block diagram illustrating an example hierarchical route generation, provision, and selection system.

FIG. 1A is a block diagram of an example system 100 for hierarchical route generate, provision, and selection. As shown, the system 100 includes a centralized server 101 including an instance of a centralized navigation engine 120, one or more vehicle platforms 103*a* . . . 103*n* including instances of a navigation application 122*a* . . . 122*n*, and one or more localized servers 107*a* . . . 107*n* including instances of a localized navigation engine 124*a* . . . 124*n*. The centralized server 101 and the one or more localized servers 107a . . . 107n may be coupled for electronic communication via a network 105.

The one or more vehicle platforms 103a . . . 103n may be coupled to the one or more localized servers 107a . . . 107n for electronic communication with other components of the system 100 via the network 105. In FIG. 1A and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1A is provided by way of example and the system 100 and/or further systems contemplated by this present disclosure may include additional and/or fewer components, may combine components and/or divide one or more of the components into additional components, etc. For example, the system 100 may include any number of vehicle platforms 103, localized servers 107, networks 105, or centralized servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-infrastructure/infrastructure-to-vehicle (V2I/I2V) networks, vehicle-to-infrastructure/infrastructure-to-cloud (V2I/I2C) networks, vehicle-to-infrastructure/vehicle-to-everything (V2I/V2X) networks, or any other wireless networks. Although FIG. 1A illustrates a single block for the network 105 that couples to the centralized server 101 and the localized server(s) 107, it should be understood that the network 105 may in practice comprise any number of combination of networks, as noted above.

The vehicle platform(s) 103 include computing device(s) 152 having processor(s) 115, memory(ies) 117, communication unit(s) 119, input and/or output device(s) 121, a vehicle data store 123, and an instance of a navigation application 122 (e.g., 122a). Examples of computing device(s) 152 may include virtual or physical computer processors, control units, micro-controllers, etc., which are coupled to other components of the vehicle platform(s) 103, such as one or more sensors 113, actuators 128, engine(s), etc.

The vehicle platform(s) 103 are capable of transporting from one point to another. Non-limiting examples of the vehicle platform(s) 103 include a vehicle, an automobile, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s). As it travels down the roadway, a vehicle platform 103 may hop between localized servers 107 associated with different sequential segments of a roadway. For example, the vehicle platform 103a may connect to and communicate with localized server 107a when driving along a first roadway segment and then connect to and communicate with a second localized server 107n when driving along a second roadway segment. In some cases, the connections 106a and 106n represent V2I connections that provide the vehicles 103 access to any applicable data and allow the vehicles 103 to transmit data for any suitable purpose. These connections also allow vehicle infrastructure, support systems, and any suitable Internet-based services to push data to the computing devices 152 of the vehicles 103, and to receive data from the vehicles 103.

Each vehicle platform 103 may send data to and receive data from other vehicle platform(s) 103, other localized servers 107, and/or the navigation server(s) 101 via the network 105 through the localized server 107 to which the vehicle platform 103 is currently connected at a particular point in time, or via other network data connection(s), such as connection 156, which may represent a satellite Internet connection, a cellular data network connect, or other suitable network connection.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geolocation sensors (e.g., GPS sensors), orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle platform 103 in order to capture the situational context surrounding the vehicle platform 103.

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores.

In the context of the vehicle platform 103, the processor may be an electronic control unit (ECU) implemented in the vehicle platform 103 such as a car, although other types of platform are also possible and contemplated. The ECU(s) may receive and store the sensor data (e.g., the Global Positioning System (GPS) data) as vehicle operation data in the vehicle data store 123 for access and/or retrieval by the vehicle navigation application 122. In some implementations, the processor(s) 115 may be capable of generating and providing electronic display signals to the input/output device(s) 121, supporting the display of images, capturing and transmitting images, performing complex tasks including various types of data decoding and route change detection, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, the input and/or output device(s) 121, and/or the vehicle data store 123.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the vehicle navigation application 122 and/or the navigation application 122. In some implementations, the memory(ies) 117 may include one or more of volatile memory and non-volatile memory. For example, the memory(ies) 117 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 117 may be a single device or may include multiple types of devices and configurations.

The communication unit 119 transmits data to and receives data from other computing devices to which it is communicatively coupled (e.g., via the network 105 through the localized servers 107) using wireless and/or wired connections. In some embodiments, the communication unit 119 may couple to the localized servers 107 to obtain network access to the network 105 and communicate with other computing nodes, such as other vehicle platform(s) 103 and/or the navigation server(s) 101, etc. via the network 105. The communication unit 119 may include one or more wired interfaces and/or wireless transceivers for sending and receiving data. The communication unit 119 may exchange data with other computing nodes using standard communication methods, such as those discussed above.

The input and/or output (I/O) devices 121 include any standard devices for inputting and/or outputting information. Non-limiting example IO devices 121 include a screen (e.g., touchscreen, LCD, LED, etc.) for displaying notifications (e.g., notification of connection establishment, notification of route recalculation, etc.), indicators, an audio reproduction device (e.g., speaker), a microphone, and any other I/O components for facilitating communication and/or interaction with users. Input/output devices 121 can be coupled to the computing device 152 either directly or through intervening I/O controllers.

The navigation application 122 is computer logic executable to automatically determine an optimal navigation route from routing data provided by an applicable localized navigation engine 124, and/or provide navigational guidance to vehicle operators using the routing data determined by the localized navigation engine 124 and/or centralized navigation engine 120. In some embodiments, the navigation application 122 may be implemented using software executable by one or more processors of one or more computer devices, using hardware, such as but not limited to a field-programmable gate array (FPGA), an application-specific integrated circuit (ASIC), etc., and/or a combination of hardware and software, etc.

In some embodiments, the navigation application 122 may display digital maps, select a path from based on routing data provided by the localized navigation engine 124 and/or centralized navigation engine 120, generate and display user interfaces prompting a user selection of an optimized route, provide the navigation instructions of the vehicle route selected by the user via an output device 121 of the vehicle platform 103, etc.

In some embodiments, the navigation application 122 may, during navigation of a current route, automatically display updates of more optimal paths for that route for selection by a user, and/or automatically select a more optimal path and signal the processor 115, which may include an autonomous vehicle controller configured to autonomously control the vehicle to use the more optimal path using the actuator(s) 128 of the vehicle. In some cases, the navigation application 122 may detect dynamic changes in current route vehicle route based on the more optimal path information received from the localized navigation engine 124 as the vehicle platform 103 travels along the roads and automatically recalculate the vehicle route using the more optimal path information to more efficiently navigate the vehicle to the destination. Numerous other functions are also possible and contemplated. In some embodiments, the navigation application 122 may process and store the vehicle route of the vehicle platform 103 as the vehicle data in the vehicle data store 123 for later access and/or retrieval, and/or provide the selection to the localized navigation engine 124 for provision to the centralized server 101 as confirmation and/or learning, etc.

The vehicle data store 123 includes a non-transitory storage medium that stores various types of data. For example, the vehicle data store 123 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., vehicle speed, acceleration, deceleration, wheel speed (Revolutions Per Minute—RPM), steering angle, braking force, safety device states (e.g., airbag, impact/crash state, etc.), etc. In some embodiments, the vehicle data may include a vehicle identifier (ID) uniquely identifying the vehicle platform 103 (e.g., Vehicle Identification Number (VIN)). In some embodiments, the vehicle data may also include a vehicle geolocation (e.g., GPS coordinates) indicating the geographic location of the vehicle platform 103, a selected vehicle route, other possible vehicle routes, target designation, etc.

The actuator(s) 128 include mechanical and/or electrical devices that are capable of producing or inhibiting motion. The actuator(s) 128 may be electric, pneumatic, hydraulic, magnetic, mechanical, thermodynamic, and/or magnetic, and/or a combination of the foregoing. Non-limiting example actuator(s) 128 include electric motors, motorized linkages, signaling components, servomechanisms, hydraulic cylinders, pneumatic actuators, corresponding gearing, connectors, and kinematic components, combustion engines, jet engines, etc. The actuators are be coupled to components via linkages, transmissions, drivelines, hydraulics, and/or other assemblies, such as those including wheels, props, turbo fans, blowers, jets, and/or other components, that are capable of accelerating, decelerating, and steering the vehicle 103.

The centralized server 101 includes a hardware and/or virtual server that includes one or more processors, a memory(ies), and network communication capabilities (e.g., a communication unit). The memory(ies) may store instructions/computer logic, which, when executed by the one or more processors, carries out one or more of operations discussed herein. In some cases, the memory(ies) may store an instance of the centralized navigation engine 120 for execution by the one or more processors. In some embodiments, the centralized server 101 may be a computing server remotely located from the localized servers 107 and communicatively coupled to the localized servers 107 via the network 105.

For example, the centralized server 101 may be a cloud server residing in a data center. The centralized server 101 may be communicatively coupled to the network 105, as reflected by signal line 158. In some embodiments, the centralized server 101 may send and receive data to and from other entities of the system 100, e.g., one or more localized servers 107, one or more vehicle platforms 103, etc., via the network 105.

In some embodiments, the centralized server 101 may be provided with large amount of hardware resources, computation capabilities, and/or network capabilities for supporting and managing the data transmission of multiple localized servers 107. For example, the centralized server 101 may have large data storage capacity, stationary, and reliable network connections with large bandwidth. As depicted, the centralized server 101 may include an instance of the centralized navigation engine 120, a preference data store 124, and a centralized navigation data store 155 that store various types of data for access and/or retrieval by this application.

The centralized navigation engine 120 and the localized navigation engine 124 are computer logic executable by one or more processors to cooperatively generate hierarchical routing data for provision to vehicles 103. As illustrated in FIG. 1A, the centralized server 101 may include an instance of the centralized navigation engine 120, and the localized servers 107a . . . 107n may include the instances of the localized navigation engine 124a . . . 124n.

In some embodiments, the centralized navigation engine 120 and/or the localized navigation engine 124 may be implemented using software executable by one or more processors of one or more computer devices, using hardware, such as but not limited to a field-programmable gate array (FPGA), an application-specific integrated circuit (ASIC), etc., and/or a combination of hardware and software, etc. The centralized navigation engine 120 and/or the localized navigation engine 124 may receive and process the various data described herein, and communicate with other elements of the vehicle platform 103 via the bus 154, such as the memory 117, the communication unit 119, one or more input and/or output devices 121, the vehicle data store 123, etc. The centralized navigation engine 120 and/or the localized navigation engine 124 are described in further detail below.

Figure 2D:
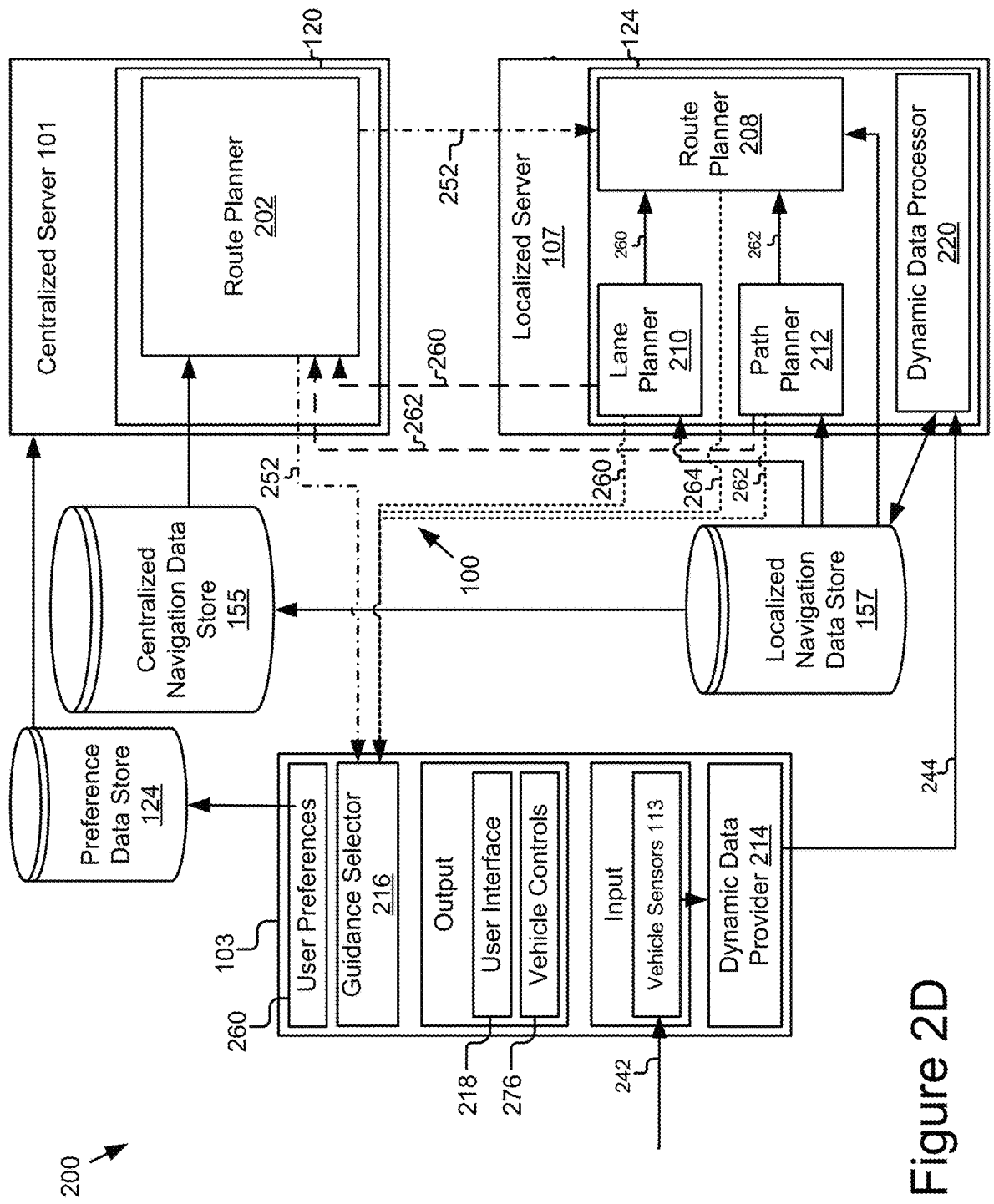
FIG. 2D is a block diagram of an example dataflow of various components of the hierarchical navigation system.
Figure 2E:
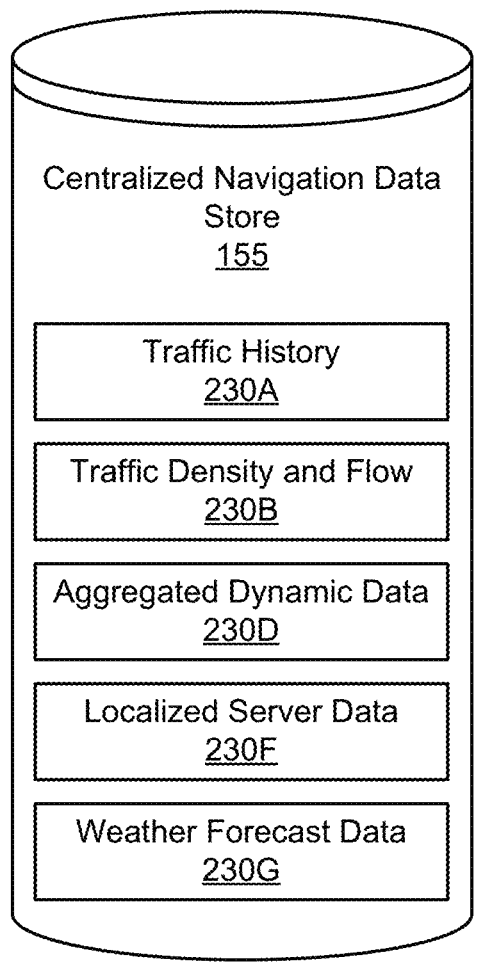
FIGS. 2E and 2F are block diagrams of an example centralized navigation data store and an example localized navigation data store.
Figure 2F:
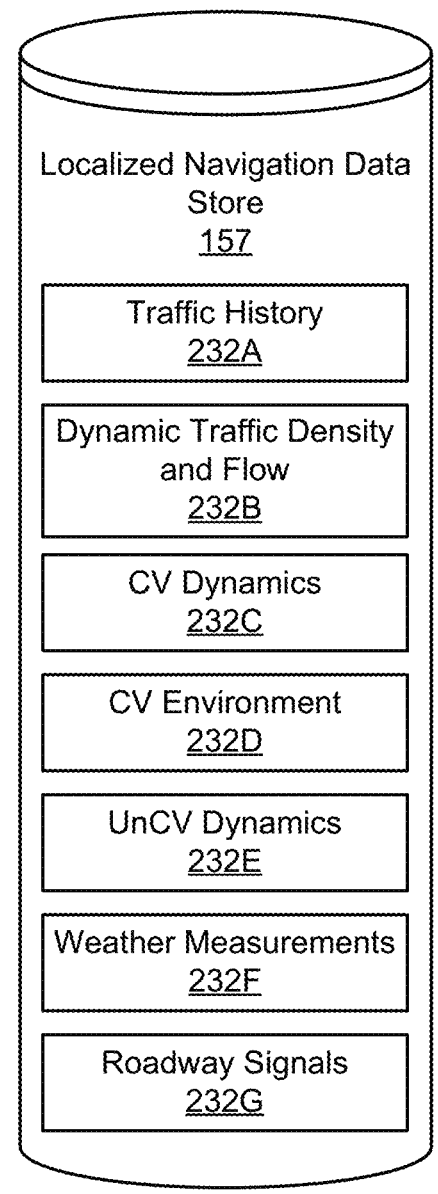

In some embodiments, the centralized data store 155, the localized navigation data store 154, and/or the preference data store 124 include one or more non-transitory storage media that store navigation-related data described herein, such as depicted in FIGS. 2E and 2F. The preference data store 124 may store user preference data for routes computed by the system 100, as discussed further below.

The localized server 107 includes a hardware and/or virtual server that includes a processor, a memory, and network communication capabilities (e.g., a communication unit). In some embodiments, the localized server 107 may be a computing infrastructure located on the roadside of the roads on which the vehicle platforms 103 travel. For example, the localized server 107 may be a roadside unit located along the roadway, an edge server located within a predetermined distance from the roadway, a cellular base station, a remote server particularly associated with the roadway and having a low-latency connection with connected vehicles traversing the roadway, etc.

In some embodiments, the localized servers 107 may be provided with limited amount of hardware resources, computation capabilities, and/or network capabilities because of the cost efficiency and their roadside placement. For example, the localized servers 107 may have limited processing capacity, limited memory space, intermittent network connections with relatively low bandwidth, etc. In some embodiments, the limited resources of each localized server 107 may need to be optimally distributed among multiple vehicle platforms 103 that are communicatively coupled to the localized server 107. In some embodiments, the vehicle platforms 103 communicatively coupled to the localized server 107 may include the vehicle platforms 103 located within the communication coverage area 192 of the localized server 107 at a particular point in time.

In some embodiments, the localized servers 107 may provide network data access, and exchange data with, the vehicle platforms 103 located within their communication coverage areas. Each edge server 107 may have a communication coverage area 192 within which the vehicle platforms 103 can establish a temporary vehicle-to-infrastructure (V2I) connection with the edge server 107 to send and receive data to and from the localized server 107. The localized server 107 may send and receive the data associated with the vehicle platforms 103 to and from other entities of the system 100 (e.g., the centralized server 101, other vehicle platforms 103, etc.) via the network 105 using its network connection 162.

Figure 1B:
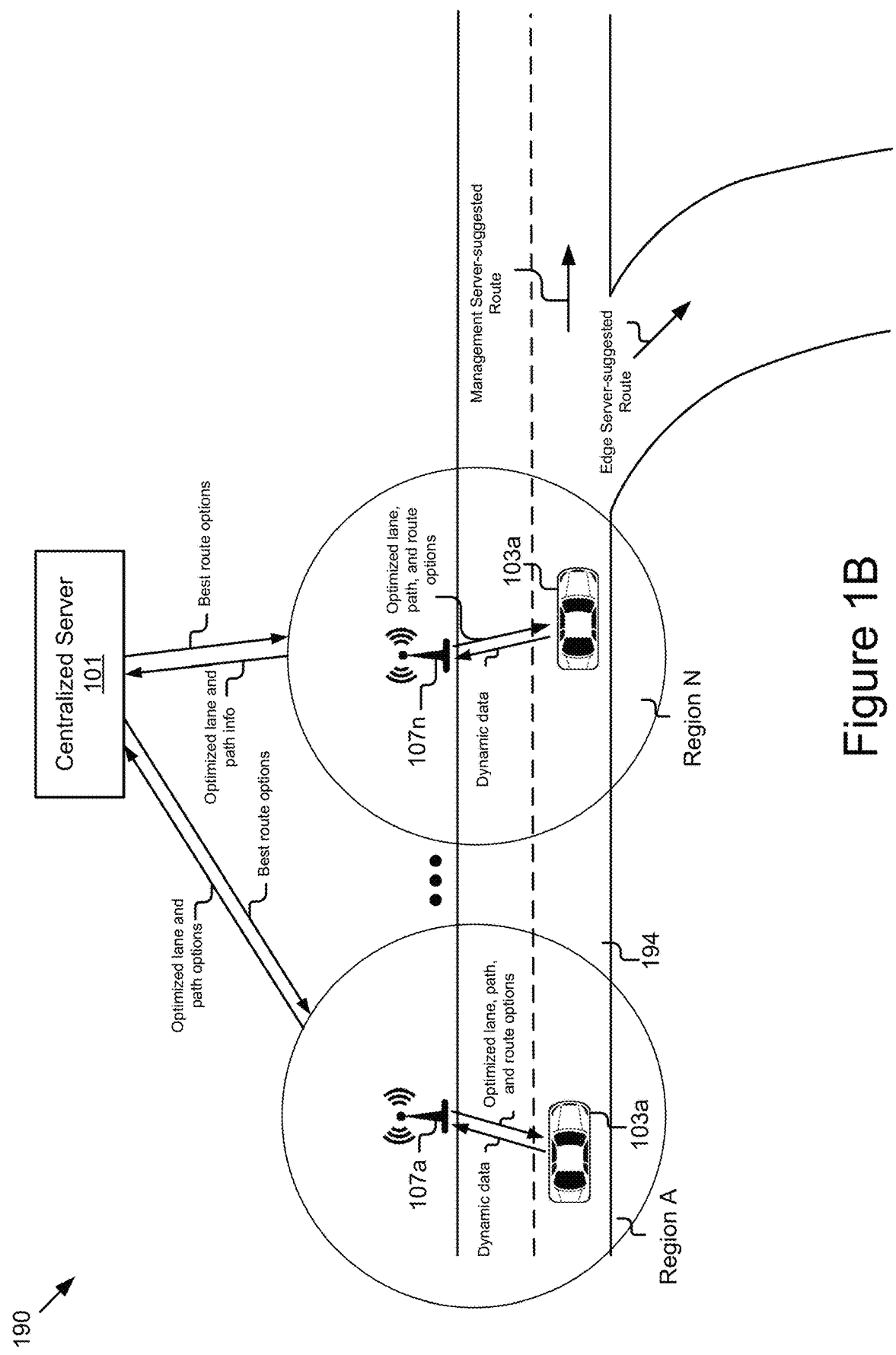
FIG. 1B illustrates an example roadway with a series edge servers provided proximate the roadway.

FIG. 1B illustrates an example roadway 194 with a series edge servers 107 provided proximate the roadway 194. A connected vehicle platform 103 connects to various edge servers 107 as it travels down the roadway 194. While in each edge server coverage area, the vehicle 103a may transmit dynamic data to the edge server 107 associated with that area, and may receive optimized routing data, such as optimal lane, path, and/or route option(s). For example, in region A, the vehicle 103a may transmit dynamic data to the edge server 107a and receive optimized lane, path, and/or route options from the edge server 107a, as determined by the edge server 107a and/or the centralized server 101. For instance, the edge server 107a may process optimized lane and path options based on dynamic data received from the vehicle 103a, and the centralized server may use the optimized lane and path options, and centralized data from the centralized data store 155, to determine the best routes for the vehicle. The centralized server 101 may provide routing data including those routes to the edge server 107a for provision to the vehicle 103a or may provide them directly to the vehicle via an alternative, more direct data connection (e.g., via the network 105). Additionally, the localized server 107 may compute route options based on the lane and path options it determined based on region-specific parameters, and provide them (with the centralized server 101—determined options) to the vehicle 103a. The navigation application 122 may process the routing data including the optimized lane, path, and/or route options, and provide them for selection or automatically determine which route to use for navigating the vehicle 103a.

As the vehicle platform 103a proceeds along the roadway 194, the vehicle platform 103a may depart from the communication coverage area (region A) of the localized server 107a, and enter the communication coverage area (region N) of the localized server 107n. In region N, the vehicle 103a may transmit dynamic data to the edge server 107b and receive optimized lane, path, and/or route options from the edge server 107b in a manner similar to that in region A.

As a further example, the vehicle 103a may receive an optimized route option in region A which is then selected for travel. Upon entering region N, the vehicle 103n may receive newer route options including a management server-suggested route and an edge server-suggested route. One of the newer routes may be selected based on user preferences and/or other criteria, as discussed in further detail elsewhere herein.

The process described with reference to FIG. 1B may continue for further regions traversed by the vehicle 103a.

It should be understood that the system 100 illustrated in FIG. 1A is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

FIGS. 2A-2C are block diagrams of an example centralized navigation engine 120, an example localized navigation engine 124, and a vehicle navigation application 122. As depicted, the centralized navigation engine 120 may include a route planner 202, although it should be understood that the centralized navigation engine 120 may include additional components such as, but not limited to, a training engine, an encryption/decryption engine, etc., and/or these various components may be combined into a single engine or divided into additional engines.

The localized navigation engine 124 may include a route planner 208, a lane planner 210, a path planner 212, and a dynamic data processor 214, although it should be understood that the localized navigation engine 124 may include additional components such as, but not limited to, a training engine, an encryption/decryption engine, etc., and/or these various components may be combined into a single engine or divided into additional engines.

The vehicle navigation application 122 may include a guidance selector 216, a user interface 218, and a dynamic data provider 220, although it should be understood that the vehicle navigation application 122 may include additional components such as, but not limited to, a training engine, an encryption/decryption engine, etc., and/or these various components may be combined into a single engine or divided into additional engines.

The components 120, 124, 122, 202, 208, 210, 212, 214, 216, 218, and/or 220 may be implemented as software, hardware, or a combination of the foregoing. The components 210, 212, and 214; and/or 216, 218, and/or 220 may be communicatively coupled by bus (e.g., the bus 154) and/or processor (e.g., the processor 115) to one another and/or the other components of a corresponding computing device of the entity (e.g., the computing device 152 of the vehicle platform 103).

In some embodiments, one or more of the components 120, 124, 122, 202, 208, 210, 212, 214, 216, 218, and/or 220 are sets of instructions executable by a processor (e.g., such as a memory like the processor 115) to provide their functionality. In further embodiments, one or more of the components 120, 124, 122, 202, 208, 210, 212, 214, 216, 218, and/or 220 are storable in a memory (e.g., such as a memory like the memory 117) and are accessible and executable by the processor (e.g., the processor 115) to provide their functionality. In any of the foregoing embodiments, these components 120, 124, 122, 202, 208, 210, 212, 214, 216, 218, and/or 220 may be adapted for cooperation and communication with a processor and other components of a computing device.

The components 120, 124, 122, 202, 208, 210, 212, 214, 216, 218, and/or 220 are described in further detail below.

FIG. 2D is a block diagram of an example dataflow 100 of various components of the hierarchical navigation system 100. Vehicles in the system 100 collect sensor data, which is processed and interpreted to determine the dynamics of the vehicles and their surrounding environment. Advantageously, the system 100 can automatically and persistently (at various intervals (fixed, as-it-occurs, etc.), continuously, in tranches, etc.) collect various different types of data from the vehicle sensors 113 at desired levels of granularity (e.g., time intervals, sensor gains, etc.). In some embodiments, the intervals at which the sensor data is aggregated from vehicles 103 may predetermined.

This is different that the solutions described in the background, that just collect data when a mapping application is loaded and in use on the user's portable electronic device, location tracking for the application is enabled, and/or when the user inputs an event or confirmation of an event (e.g., the user witnesses an event while driving on the roadway and inputs the nature and occurrence of the event in the application).

As discussed elsewhere herein, the system 100 can uniquely combine this information with other navigation-related data, which may be historical, semi-current, and/or current data. The other navigation-related data may include data reflecting roadway congestion, accidents, closures, construction, capacity, expected load, weather, etc., such as but not limited to, roadway maps, historical traffic data for the roadway, construction data, current traffic data for the roadway, weather information about the state of the weather along the roadway, emergency responder data, etc., produce optimized reflection of the states of the roadways. The data may be high-resolution in terms of time, reflecting second-by-second changes.

FIGS. 2E and 2F are block diagrams of an example centralized navigation data store 155 and an example localized navigation data store 157. The centralized navigation data store 155 contains a different assortment of data than the localized map data store 154.

As discussed above, the centralized server 101 may comprise and/or be included in a data center that aggregates data from numerous vehicles that are traversing different roadways in various different geographical areas. As such, the volume of data received and processed by the centralized server 101 on a day-to-day basis may be huge and require significant computational resources in order to interpret properly. For example, the centralized server 101 may receive continual updates to weather conditions, traffic conditions, emergency response events, planned or unplanned roadway closures, planned or unplanned construction events, community events attended by thousands of people, etc., for all roads in all cities of every state of countries with millions of daily drivers. The impact and correlation of such data requires the application of advanced heuristics and data science algorithms, which can take many minutes, and in some cases hours or days.

Advantageously, the system 100 uses a hierarchical distributed architecture where localized routing calculations are performed at localized servers 107 associated with different roadway segments. Unlike the centralized server 101, the localized servers 107 and focus calculations on the roadway segments with which they are associated, which results in less complex, more efficient calculations using data that is more current than the data that the centralized server 101 has access to. Further, advantageously, the system 100 can process sensor data captured by vehicle sensors of the connected vehicles to generate dynamic data for non-connected vehicles.

More particularly, as shown in FIG. 2D, the centralized navigation data store 155 may include traffic history data 230A, traffic density and flow data 230B, aggregated dynamic data 230D, localized server data 230F, and weather forecast data 230G.

The traffic history data 230A is historical data describing the traffic for any given point along a roadway. The historical data may describe the traffic lane-by-lane, over time for any suitable point along the roadway. The historical data for a given roadway location may be indexed and/or queried using geolocation data (e.g., coordinates, address, line marker, etc.) for that location. The historical data may be averaged across different dimensions, such as days of the week, times of the day, etc. The historical data may also be analyzed and updated to include various temporal findings such as variables that can disproportionately affect traffic at various times, such as large events, seasonal variables (e.g., holiday traffic, etc.), natural disaster and or weather-related effects, etc., caused by prior natural disasters and/or weather.

The traffic density and flow data 230B may reflect the density and/or flow of vehicular traffic on all roadways monitored by the centralized server 101. The traffic density and flow data 230B for a given roadway location may be indexed and/or queried using geolocation data (e.g., coordinates, address, line marker, etc.) for that location. The density underflow of vehicular traffic of a given roadway may be generalized across all of the lanes of the roadway in some cases, as the data may not be granular enough to indicate which lanes flow more quickly and/or have more traffic than other lanes. In other cases, density and flow may be tracked by lane by lane. Density and flow may be estimated based on the traffic history data 230A for different temporal dimensions, such as time of day, day of the week, season, month, etc. Density and flow may additionally or alternatively be determined based on traffic signals currently being received from cars and/or infrastructure on the roadway.

For example, traffic monitoring systems may be installed along frequently congested highways and information from those traffic-monitoring systems may be received and stored as traffic density and flow data 230B. In a further example, in-vehicle navigation systems, applications installed in portable electronic devices located in the vehicles, etc., may determine and send rates of travel and their associated locations to the centralized server 101, in the centralized server 10 which may eventually process the data and estimate the traffic density (the amount of traffic) and the traffic flow based on rate of travel. However, given the number of vehicles traveling along all roadways monitored by the centralized server 101, it is impractical to process all of the data received from all vehicles in real or near-real time. Instead, heuristics are often used to estimate density for roadway, such as breaking the roadway into larger sections (e.g., 1-5 mile sections) and sampling a small percentage of the data received for each section, which reduces the granularity and amount of data that has to be processed at the cost of lower accuracy and resolution.

The aggregated dynamic data 230D includes dynamic data aggregated from the different localized navigation data stores 154 and/or vehicles 103. The aggregated dynamic data 230D for a given roadway location may be indexed and/or queried using geolocation data (e.g., coordinates, address, line marker, etc.) for that location. The dynamic data comprises sensor data captured by the sensors 113 of the respective vehicles 103 traveling the roadway. The aggregated dynamic data 230D reflects the dynamic states of the vehicles for the given geographical locations over time, and/or the dynamic states of the external environments proximate to the vehicles. The aggregated dynamic data 230D may be indexed and queried by geographic location or address in some embodiments. The dynamic data is discussed in further detail with respect to the localized navigation data store 154.

The localized server data 230F includes records for the different localized servers 107 of the system 100. A record may reflect a profile of the localized server 230F, including its specific location, a driving region covered by the localized server 230F, the segments of the roadway or roadways covered within the driving region of the localized server 230F, etc. Dynamic data 230D that aggregated and stored in the centralized navigation data store 252 may be correlated in the data store 252 with the localized server 107 to which it corresponds.

In some embodiments, localized server data associated with a given localized server 107 may include a unique localized server ID, a localized server geolocation indicating geographic location (e.g., GPS coordinates) of the localized server 107, coverage data describing a communication coverage area of the localized server 107, etc. In some embodiments, the communication coverage area of a particular localized server 107 may be the coverage area within which the localized server 107 can communicate with the vehicle platforms 103. Non-limiting examples of the coverage data include, but are not limited to, coverage geolocation (e.g., GPS coordinates), coverage boundary (e.g., geometric shape and size), etc., of the communication coverage area. In some embodiments, localized server data associated with a given localized server 107 may include performance metrics (e.g., channel quality metrics, computation load metrics, etc.) and/or the amount of server resources (e.g., edge server resources, network bandwidth, memory space, processing capacity, etc.) currently available at the localized server 107.

The weather forecast data 230G includes current and future weather conditions affecting the various roadway segments monitored by the centralized server 101. The weather forecast data 230G may be ingested from a third-party server that is configured to provide weather data for different regions. In some instances, the centralized server 101 may access the weather data using one or more application programming interfaces of the third-party weather server. In some embodiments, the centralized server 101 may receive weather data from weather stations covering areas in which roadways are located. Other variations are also possible and contemplated. The weather data or a given roadway location may be indexed and/or queried using geolocation data (e.g., coordinates, address, line marker, etc.) for that location.

As shown in FIG. 2E, the localized navigation data store 154, which corresponds to a specific localized server 107 that covers a particular geographic region that includes one or more roadway segments, may include traffic history data 230A, dynamic traffic density and flow data 232B, connected vehicle (CV) dynamics data 232C, CV environment data 232D, UnCV dynamics 232E, weather measurements data 232F, and roadway signals data 232G, for that region.

The traffic history data 232A may include the same or similar data as that described with reference to traffic history data 230A above for the roadways that are specifically covered by the localized server 107 to which the traffic history data 232A corresponds.

The dynamic traffic density and flow data 232B may dynamically reflect the density and/or flow of vehicular traffic on the roadways within the region monitored by the location server 107. The dynamic traffic density and flow data 232B differs from the traffic density and flow data 230B in that it may further be based on the sensor data received from the vehicles 103 located in the region.

The sensor data described herein, such as below in reference to the CV dynamics data 232C, 232D, and 232E, may be processed to determine the traffic density at a higher resolution (smaller roadway segment sizes) for each lane of the roadway including the shoulders, merging and turning lanes, etc. For example, by knowing the specific lanes the vehicles are located in, the number of vehicles are trying to change lanes, and how far apart the vehicles are based on their location, speed, and acceleration, the dynamic data processor 214 may generate and store dynamic density and flow data 230B for the roadway in the region covered by the location server 107 without significant lag and in real time to reflect they dynamic state of the roadways in the region. Further, the dynamic data processor 214 may process the foregoing information for smaller units of measure than mile-by-mile or larger, such as by the meter, decimeter, etc., or by the yard, foot, inches, etc., e.g., and in some cases up the resolution of the positioning system that calculates the vehicle location.

The dynamic traffic density and flow data 232B may also advantageously reflect the dynamic states of unconnected vehicles, as discussed elsewhere herein.

The CV dynamics data 232C includes and/or is generated based on sensor data received from the vehicles 103 in the region of the localized server 107. The sensor data reflects dynamic states of the vehicles. The dynamic states reflect any suitable operational aspects of the vehicles, such as maneuvering, positional, and functional states of the vehicles. For example, the dynamic data reflects, over time:
which vehicles are running or not;
which vehicles are braking, the geographic locations where they are braking, which lanes they are braking in, etc.;
which vehicles are accelerating, the geographic locations where they are accelerating, which lanes they are accelerating in, etc.;
which vehicles are changing lanes, and what lanes they are changing into;
the speed at which the vehicles are traveling;
the geographic locations of the vehicles as they are traversing the roadway;
which vehicles have engine error states that are triggered and are disabled;
which vehicles have an emergency state triggered, such as an impact sensor triggered and the time it was, an airbag sensor showing an airbag was deployed and the time it was deployed, etc.
which vehicles have their windshield wipers running;
which vehicles have four or all-wheel drive activated;
which vehicles are have traction control engaging;
etc.

The CV environment data 232D includes and/or is generated based on sensor data received from vehicle(s) 103 in the region of the localized server 107. The CV environment data 232D reflects the external environment surrounding the vehicle. A vehicle's external environment may extend a predetermined distance from the vehicle, and may vary sensor by sensor. In some cases, the range of a sensor may determine the scope of the external environment proximate the vehicles that can be monitored.

The CV environment data reflects the existence of objects proximate the vehicles, such as adjacent vehicles, construction zones, obstructions, weather, conditions, etc. Examples include:
Image data capturing the environment proximate (in front, to the side, behind, etc.) a vehicle, and objects in that environment, such as other vehicles, lane markers 9 e.g., stripes, lines, etc.), roadway signs (e.g., construction signs, speed limit signs, directional signs, etc.);
Proximity data reflecting the distance from the vehicle to objects surrounding the vehicles, such as other vehicles;
Weather data reflecting the weather external to the vehicle (e.g., whether it is raining, snowing, etc., and how hard, etc.; temperature external to the vehicles; cross winds and corresponding speeds, etc.);
Etc.

The UnCV dynamics data 232E includes data processed by the dynamic data processor 214 reflecting the vehicles in the region that are unconnected. An unconnected vehicle is a vehicle that lacks wireless communication capability and is unable to transmit data to a localized server 107. Externally facing sensors 113 of the connected vehicle 103, which are capable of communicating dynamic data to localized servers 107, may capture image depicting adjacent vehicles, and the dynamic data processor 214 may perform object detection on the images depicted by the image data and process the vehicles included therein. The dynamic data processor 214 may estimate the depth of the vehicles in the images (e.g., a three-dimensional location) and correlate them with the known positions of the connected vehicles to determine the positions of the unconnected vehicles to generate more granular accurate dynamic map data that can be used by the route, lane, and path planners to generating routing instructions, as discussed further herein. As a result, the system 100 provides significant technical improvements that can more navigate vehicles 103 more accurately than prior solutions, by at least accounting for the locations of the vehicles 103 that are unconnected and not capable of relaying their positions and/or other information.

The weather measurements data 232F includes data reflecting the measurements taken by roadway-positioned weather stations. In some embodiments, weather instruments, such as a thermometer, barometer, anemometer, etc., may wiredly or wirelessly coupled to a localized server 107, and the localized server 107 may include software capable of processing the signals and storing the weather measurements as weather measurement data 232F in the localized navigation data store 154. In some embodiments, separate weather measurement devices with communication capabilities may be located in the region and configured to transmit weather data to the localized server 107, which may receive and store it. Other variations are also possible where the localized server 107 receives weather forecast data 230G and stores it as weather measurement data 232F.

The roadway signals data 232G includes data reflecting the signalization state of roadway traffic signal devices located along the roadways in the region monitored by the localized server 107. The states of the signals may be updated as they change, and the effect on traffic may be identified and recorded in the localized navigation data store 154 and accounted for by the planning performed by the localized navigation engine 124.

Any/all of the data discussed with reference to the centralized navigation data store 155 and the localized navigation data store 154, may be geographically localized, indexed, and/or queried or other processed using location. Location may be processed using any suitable quantifier, such as geographical coordinates (e.g., latitude, longitude, etc.), satellite positioning system coordinates (e.g., GPS, GLONASS, Galileo, Beidou, IRNSS, QZSS, etc.), etc., or other position system coordinates (e.g., signal triangulation systems (e.g., cell-tower-based positioning systems, etc.), IP location determination systems, etc.).

As a result, many popular navigation and mapping applications calculate navigation routes using previously computed estimates combined with incomplete reflections of current roadway conditions. As a result, these navigation routes are often imprecise and sometimes inapplicable, but are tolerated because they are what is available and generally better than having no guidance.

Referring again to FIG. 2D, the data for 200 reflects various methods for processing optimal routing data that provides more granularity and precision then routes processed by prior solutions, such as those discussed above in the Background section.

The vehicle 103 is equipped with vehicle sensors 113. The sensors 113 include sensors for monitoring the dynamic state of the vehicle 103 and externally facing sensors for sensing the environment external to the vehicle 103. Inputs 242 are captured by the vehicle sensors 113 and provided to the dynamic data provider 220. The dynamic data provider 220 includes computer logic executable by the one or more processors 115 of the vehicle 103 to process and transmit the sensor data 244 to a localized server 107 to which the vehicle 103 is communicatively coupled.

In some embodiments, the vehicle 103 may be traveling on a roadway through a region that is serviced by a localized server 107, and in which the localized server 107 comprises an access point. The localized server 107 may broadcast its availability via a communication unit of the localized server 107, and the vehicle 103's communication unit 119 may capture the broadcasted signal, in response to which the vehicle navigation application 122 or another application, such as an operating system of the computing system 152 of the vehicle 103, may establish a secure communication channel with the localized server 107. In some embodiments, the vehicle 103 and the localized server 107 may authenticate with one another using an encrypted authentication protocol suitable for authenticating vehicles.

The vehicle 103 may authenticate with the localized server 107 using any suitable secure, encrypted authentication protocol (e.g., such as one using public and private digital keys, multi-factor authentication, etc.). For instance, suitable security mechanisms that provide message authentication and message encryption for privacy reasons in some cases may be used. Message authentication helps to ensure the all messages are sent by legitimate senders, and may be built on baseline communication protocols. For example, DSRC can provide digital signatures based on Elliptic Curve Digital Signature Algorithm (ECDSA) so that a receiver can verify the identity of the corresponding senders. Regarding the security key management (which is often used by available security mechanisms including ECDSA), a public key infrastructure (PKI) or a security certificate management system (SCMS) may be used and provided by, linked with the cloud service. In some embodiments, when a vehicle 103 or the localized server 107 senses any suspicious behavior of another vehicle 103, it can report the suspicious behavior to other localized servers and the centralized server 101, which can accumulate the information for more accurate detection and react if necessary.

In some embodiments, a localized server 107 may comprise dedicated communication hardware called roadside units (RSUs), which enable V2I communication. RSUs may be installed in a proximity to roadways, such as freeways, highways, city streets, and/or intersections to communicate with vehicles, although other variations are also possible and contemplated, as discussed further elsewhere herein. An RSU may be able to communicate with cloud services, such as the centralized server 101, via a high-bandwidth wired connection. The centralized server 101 or localized server 107 may provide authentication data for authenticating vehicles 103 with the localized servers 107.

In some embodiments, the vehicle 103 may be coupled via its communication unit 119 to the network 105 and may look up an IP address of the localized server 107 based on the location of the vehicle 103. For example, the vehicle 103 may include a lookup table in the vehicle data 123 which it may query based on the geographic location of the vehicle 103, which the vehicle may determine using a positioning system (e.g., GPS).

The dynamic unit provider 214 may receive, process, and transmit dynamic data 244 to the localized server 107 to which it is coupled at various intervals. For example, as the sensors 113 capture sensor data (e.g., based on a computational clock cycle or other timing mechanism), the dynamic data provider 214 may process and transmit that data. In further embodiments, the dynamic data provider 214 may buffer the sensor data for a certain period of time and then transmit the data. In periods where no connection with a localized server 107 is available, the dynamic data provider 214 may cache the sensor data and provide it once a connection with a localized server 107 has been established, so that the dynamic data may be processed into historical dynamic data for the locations to which it corresponds. Other variations are also possible and contemplated.

Responsive to receiving the dynamic data from the vehicle 103, the localized server 107 that is monitoring the region in which the vehicle is located, may process the dynamic data to determine optimal lanes and paths for the vehicle 103.

In particular, the dynamic data processor 220 may receive the dynamic data 244 comprising the sensor data prepared and provided by the dynamic data provider 214, process the dynamic data 244, and store the dynamic data in the localized navigation data store 157 of the localized server 107 and/or provide the processed dynamic data to the path finder 212, the lane planner 210, and/or the route planner 208 for use in calculating the path(s), the lane(s), and/or the route(s).

The lane planner 210 determines which lanes of the upcoming roadway that the vehicle is to traverse are the optimal lanes for the vehicle. The lane planner 210 may evaluate any of the datatypes described with reference to FIG. 2F when determining the optimal lanes.

In some embodiments, the lane planner 210 may analyze the sensor data of the vehicle to determine the speed of the vehicle and whether or not the vehicle is accelerating or decelerating (or stopped), and compare that with the speed and acceleration/deceleration a vehicles in the same lane and adjacent lanes of the roadway to determine which lane has vehicles traveling in it that are the most consistent with the dynamic state of the vehicle.

In some embodiments, the lane planner 210 may detect based on the dynamic data of vehicles ahead on the roadway in the same lane as a target vehicle that those vehicles have experience a slowdown (based on their braking state, deceleration state, etc.), and may calculate for the target vehicle a left lane change to a left lane that is not experiencing a slowdown.

In some embodiments, the lane planner 210 may receive a fresh cycle of dynamic data from a vehicle that has crashed into a barrier. The dynamic data from that vehicle reflects the location of the crash, that an impact sensor was triggered and/or an airbag sensor reflects an airbag was deployed, and a wheel rotation sensor determined that the car is stopped/traveling at 0 miles per hour. The lane planner 210 may process the dynamic data and determine lane changes for all vehicles proximate to an approaching the crash scene to move those vehicles to lanes that are the furthest away from the crash scene.

In some embodiments, the dynamic data processor 220 may emulate dynamic data for cars that are not connected based on sensor data captured by connected vehicles. For example, connected vehicles may capture sensor data that includes the unconnected vehicles, and the dynamic processor 220 may identify the unconnected vehicles in the data, and provide the data reflecting the unconnected vehicles to the lane planner 210, path planner 212, and/or the route planner 208 for processing and/or consideration when determining optimal routing data for connected vehicles.

For example, the lane planner 210 and/or the dynamic data processor 220 may identify, using the dynamic data from the vehicles 103 located in the region, one or more unconnected vehicles in lanes ahead of a target vehicle for which optimize routing data is being computed and may generate lane changes based on the presence or absence of the one or more unconnected vehicles. In some embodiments, a vehicle location mapping may be stored as dynamic traffic density and flow data 232B in the localized navigation data store 157. The vehicle location mapping may reflect the current locations of connected and unconnected vehicles, with the locations of the unconnected vehicles being determined as discussed above using the sensor data of the connected vehicles 103. The lane planner 210 may utilize the dynamic mapping data showing the locations of the unconnected vehicles to map lane changes that optimize the flow of the connected vehicles traversing the roadways of the region. Since the connected and unconnected vehicles may change their course regardless of the routing data being provided, the localized navigation engine 124 may continually process the dynamic data being received from the vehicles to determine the most optimal lanes, paths, and routes for the connected vehicles.

In some embodiments, the lane planner 210 considers the dynamic data in conjunction with other data, such as traffic history data 232A. Traffic history data 232A reflect historical averages related speeds, lane densities, and so forth, may consider the current trajectories of connected vehicles as reflected by their dynamic data sets relative to the historical averages to compute optimal lanes options for those vehicles. In some embodiments it may be to platoon a group of connected vehicles in the same lane that have similar dynamic data to match that to historical dynamic data that has characteristics that also match characteristics of the vehicles comprising the platoon. In some cases, plurality of platoons may be formed, and the platoons may be directed to change lanes at various points in a synchronized fashion to keep the platoon's progress flowing. This way, traffic flow is further optimized along the roadway, even if traffic density is high.

The path planner 212 in process the dynamic data 244 received and processed by the dynamic processor 220. As with the lane planner 210, the path planner 212 may receive the dynamic data from the dynamic data processor 220 directly or retrieve the dynamic data from the localized navigation data store 157. The path planner 212 may analyze the dynamic data to determine changes in a given vehicle's 103 path as the vehicle is driving down the roadway. The path planner 212 may react to any changes by a vehicle 103 relative to a previously determined path as dynamic data is received and processed by the dynamic data processor 220.

In some embodiments, the path planner 212 may consider changes in the states of the roadways of the region monitored by the localized server 107, in continuously compute new path options for the vehicles 103 based on the maneuvering characteristics of the vehicles 103 as reflected by the dynamic data. As with the lane planner 210, the dynamic mapping data processed by the dynamic data processor 220 may reflect the states of the connected and unconnected vehicles, such as their trajectory, speed, acceleration/deceleration, functional status, etc. The path planner 212 may detect the changes in the dynamic mapping data between two points in time, determine which vehicles are affected by the changes, and compute new optimal path options for those vehicles 103.

In some embodiments, a first path may be determined to include a higher density and lower flow due to the presence of connected and unconnected vehicles, and may determine a second path is more optimal because, while the density of the second path may be the same, there were unconnected vehicles are traveling along that path, and thus the low rate of the traffic can be better maintained by routing further connected vehicles along that second path. Correspondingly, the lane planner 210 may calculate optimal lane changes for the second path to keep traffic flowing at a higher rate.

As with the lane planner 210, the path planner 212 can be combined traffic history data 232A with the dynamic data when calculating one or more optimal path options. For example, the traffic history data 232A may reflect which paths of the most congested historically, and what characteristics of the historical dynamic data were, and the path planner 212 may compare the historical dynamic data associated with the congestion with the dynamic data of the vehicles 103 there currently traversing a runway to determine whether there is a correlation, and if so, the path planner 212 can evaluate alternative path options the can reduce the historical congestion. Based on the results of the path options (e.g., responsive to the path options been selected and traversed, and dynamic data received during their traversal), the path planner 212 can further learn the best techniques for determining the best paths.

In some embodiments, the path planner 212 can optimize the path to reduce the amount of turning, deceleration, and acceleration necessary to traverse a particular roadway, so as to optimize the efficiency of the vehicle and limit wear and tear.

Numerous further embodiments for determining optimal lanes and paths based on dynamic data are also possible and contemplated.

In various embodiments, the lane planner 210 and/or the path planner 212 may evaluate whether measurements data 232F determine the impact of weather and or natural disasters on the current lanes and paths via which the vehicles are traveling and may further base the lane and path determinations based on weather measurements. For example, the lane planner 210 and/or the path planner 212 may detect from the dynamic data that the traction control system of vehicles 103 traveling in a given lane and/or path activating, thereby indicating loss of grip. The weather measurement data 232 may also reflect that temperatures are near freezing and rain is falling near that lane and/or path. Responsive to the foregoing determinations, the lane planner 210 and/or the path planner 212 may determine alternative lanes and/or paths as being safer for approaching vehicles 103, and the route planner 208 and/202 may generate routes that include the alternative lanes and/or paths.

The route planner 208 may receive the lane options 260 and/or the path options 262 from the lane planner 210 and the path planner 212, respectively, and generate routing options using the lane and path options.

In some embodiments, the localized navigation engine 124 may send the lane options 260 and/or path options 262 to the route planner 202 of the centralized navigation engine 120, which may process the lane options 260 and/or path options 262, and generate one or more route options based thereon. As the data available on the centralized navigation data store 155 is more comprehensive in terms of geographic area than the data in the localized navigation data store 157, covers a wider scope, and is capable of considering region-to-region vehicles characteristics (such as driving tendencies, habits, etc.), but has a greater time disparity (e.g., is less current due to processing and data communication lag), the route options 252 determined by the route planner 202 may differ from the route options 264 determined by the route planner 208. As a result the route planner 202 may provide the centralized route options 252 determined by it to the guidance selector 216 of the navigation application 122, or may provide the centralized route options 252 to the route planner 208 of the localized navigation engine 124, and the localized navigation engine 124 may provide the centralized route options 252 along with the localized route options 262 determined by it. Additionally or alternatively, the routing data provided by the localized navigation engine 124 may include the lane options 260 and/or the path options 262 in addition to/alternative to the routes 264 determined by the route planner 208

In some embodiments, user preferences may be considered by the route planner 202 when generating route options. The user preference may specify a certain characteristic for the route, or that only central or localized routes should be provided for selection, or automatically used to navigate the vehicle 103 as discussed further below.

In some embodiments, an owner or driver of the vehicle can set and or update user preferences. For example, the user interface 218 may generate and display settings graphical user interface including various settings that may be set and are changed by the stakeholder, responsive to receiving one or more changes, the user interface 218 may generate and send user preferences 260 to the preference data store 127 for storage. Some embodiments, the centralized server 101 may receive a network requests including the updated user preferences, and may update the references in association with an account of the stakeholder in the preference data store 124. However, the other variations are also possible and contemplated. Settings may be set prior to or during travel.

As a further example, for a given origin and destination point, the relevant edge server 107 and centralized server 101 may compute optimal routes based on traffic history of the various roadway segments between the points, user preferences of the driver, current traffic conditions including traffic density and flow for the various roadway segments, and the dynamic data of the driver's vehicle and the dynamic data of the other vehicles traveling the various the roadway segments (e.g., as reflected by the dynamic mapping data).

In some embodiments, such as an autonomous vehicle embodiment, based on preferences for the vehicle, a route determined by the route planner 202 and/or the route planner 208, or lane and/or path options determined by the lane planner 210 and/or the path planner 212, may automatically be selected by an autonomous vehicle control 276, which may control one or more actuators 128 of the vehicle 103 to guide the vehicle according to the selected option.

Figure 2G:
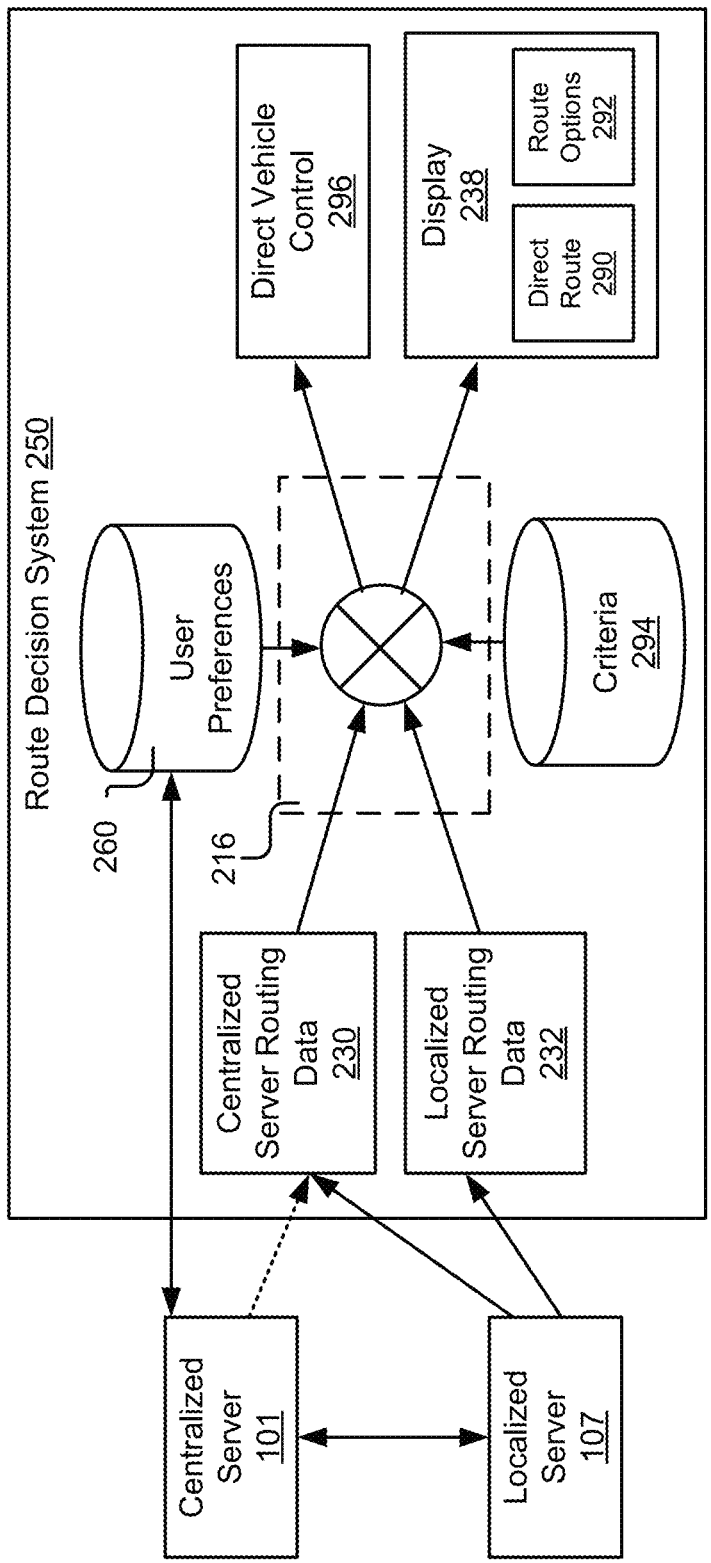
FIG. 2G is a diagram of an example route selection process.

The guidance selector 216 may select a route based on the route selection process depicted in FIG. 2G in some embodiments. Responsive to an optimal set of route(s), lane(s), and/or path(s) being sent to the guidance selector 216 of the vehicle navigation system 122, the guidance select may present the options for selection by the user, or automatically determine an option to use based on a criterion.

Figures 3A, 3B:
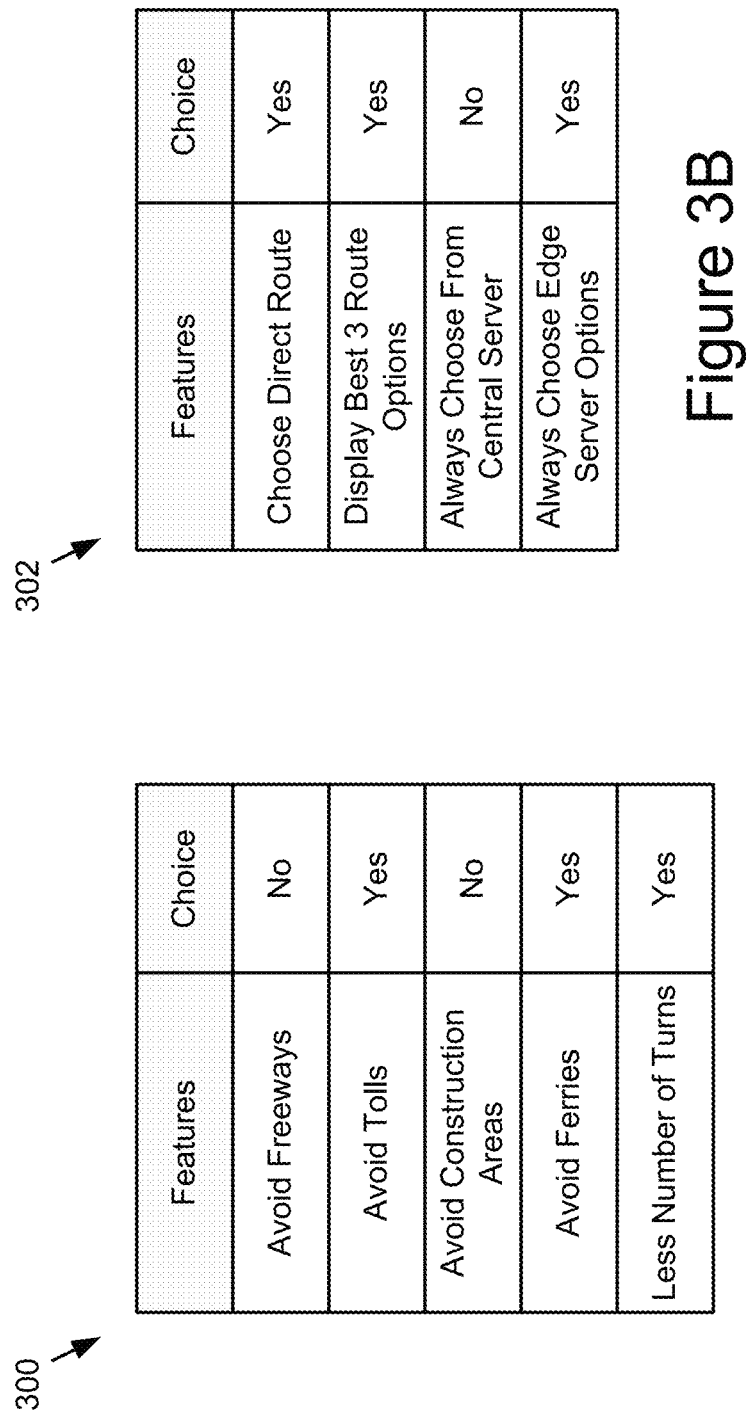
FIG. 3A depicts example user preferences.
FIG. 3B depicts example criteria.

In particular, as shown in FIG. 2G, the centralized server 101 and the localized server 107 may provide respective routing data to the group decision system 250 used by the guidance selector 216. The guidance selector 216 may consider user preferences, which may include the criteria 294, when evaluating the centralized server routing data 230 and the localized server routing data 232. Example criteria 302 are depicted in FIG. 3B, and example user preferences 300 are depicted in FIG. 3A.

Responsive to determining to directly control the vehicle, the guidance selector 216 may signal the vehicle controls 276 to control the vehicle according to the selected route option. Responsive to determining to provide routing options for presentation to a user, the guidance selector 216 may signal the user interface 218 to generate and present the options. Some embodiments, the options, such as a direct route 290 or other route options 292, may be presented on a display 238 that may be interacted with by the user using one or more input buttons, which may be virtual buttons displayed on a touch sensitive display, or hardware buttons included in the console, dashboard, or steering wheel, or another suitable location, compressible by the user to select the desired option.

For example, based on criteria set by the driver, the set of options may be presented to the driver via one or more output device(s) 121 of the vehicle 103, a particular option (e.g., first best option, localized option, centralized option, etc.) may automatically be chosen for navigation, etc. The criteria chosen may advantageously allow the driver to specify certain server-determined options over others. They criteria may be included in the user preferences stored in the preference data store 124. In the case of semi-autonomous or autonomous vehicles, the chosen option determined by the guidance selector 216 can be directly used by vehicle control system 276 for driving.

Figure 4B:
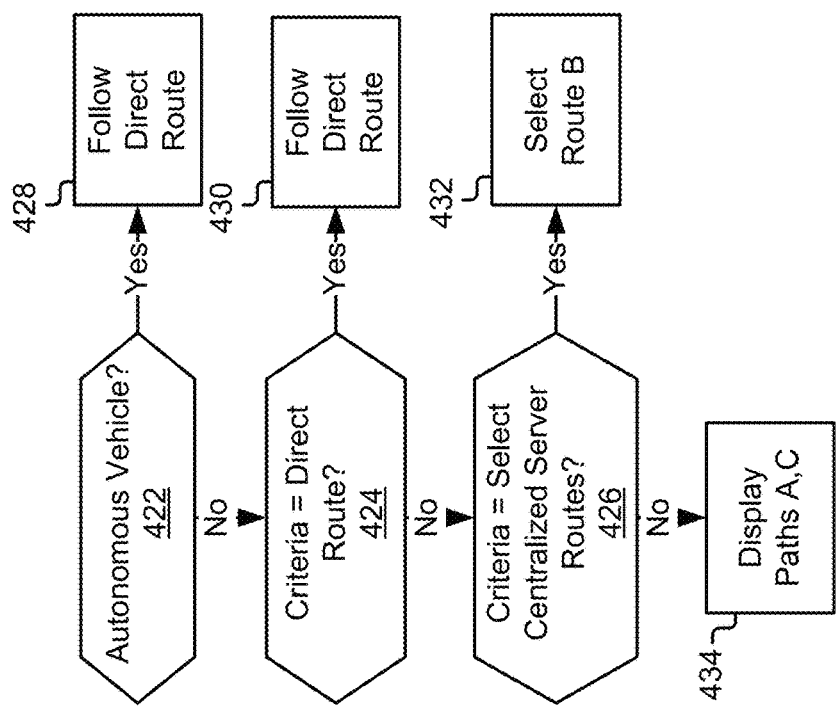
FIG. 4B is a flowchart of an example method for selecting a route in the vehicle.
Figure 4A:
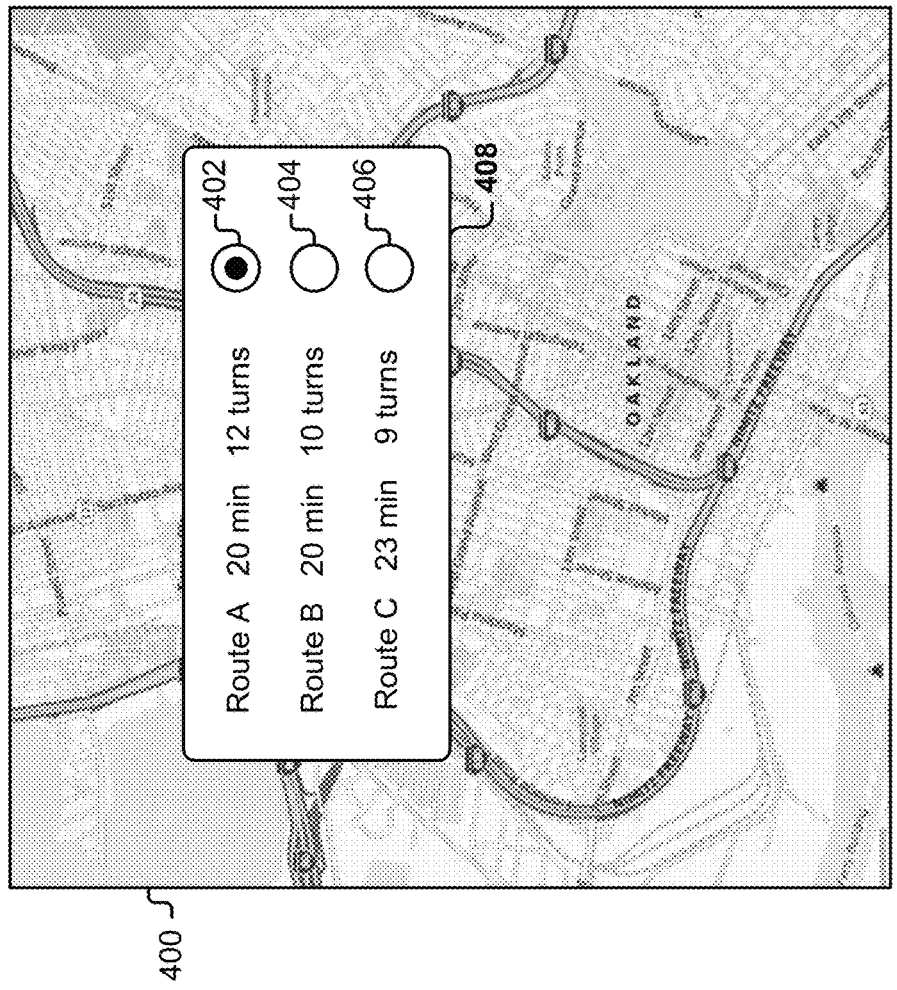
FIG. 4A is a graphical representation of an example graphical user interface.

FIG. 4A is a graphical representation of an example graphical user interface 400 that may be generated and displayed by the user interface 218. As shown, the graphical user interface 400 includes graphical elements for displaying the centralized routing options and the localized routing options.

As shown, the routing options 402, 404, and 406 showing the average travel time for the routes, and additionally the number of turns required in order to traverse the routes. The user may select a given route by tapping a corresponding selectable user interface element, such as but not limited to a radio button.

FIG. 4B is a flowchart of an example method for selecting a route in the vehicle 103.

In block 422, the guidance selector 216 determines whether or not the vehicle 103 is an autonomous vehicle. Responsive to the vehicle 103 being an autonomous vehicle, the guidance selector 216 may automatically determine, in block 428, to follow the most direct route from the current position or an origin to a destination.

Responsive to the vehicle 103 not being an autonomous vehicle, the guidance selector 216 may determine whether a criterion is set to use the most direct route. If so, the guidance selector 216 may determine, in block 430, to follow the most direct route from the current position or an origin to a destination.

If not, the guidance selector may proceed to block 426, where the guidance selector 216 determines whether a criterion specifies to select a centralized server determined route. If so, the guidance selector 216 may determine, in block 432, to display the routes determined by the centralized server 101 for selection by the user, or if just one route was provided, either providing that route for confirmation by the user by selecting the option in a graphical user interface, or automatically selecting to follow that route. For example, with reference to FIG. 4A, the graphical user interface 400 may only include option 404.

If the determination in block 426 is negative, the guidance selector 216 may, in block 434, determine to display the routes determined by the localized server 107. Alternatively, in some embodiments, the guidance selector 216 may automatically select the best route (e.g., the shortest route, the route with least amount of turns, etc.), or if only one route was provided, may automatically select that route.

In some cases, speed advantages in terms of response times and processing times are yielded by an edge server 107 because the edge server 107 is associated with a subset of vehicles within a particular region and is the first hop for the data, whereas the centralized server 101 may optimize options based on all the vehicles in entire area, which includes several regions. As such, the computations performed by the edge server 107 relative to the centralized server 101 may be more specific to the particular vehicles 103 to which it is assigned, thus producing more optimal options than the centralized server 101 in some cases.

In some cases, vehicles 103 in a given region may be assigned to a given edge server 107 that is dedicated to that region. As vehicles 103 travel, they may hop from one edge server 107 to another based on their continuously updated location. Data mapping which vehicles 107 are assigned to which edge server may be stored in the centralized data store 155. In some cases, a routing component may be included in the system 110 that may route the incoming sensor data to the proper edge server 107 for the region in which the vehicle 103 that provided the sensor data is located.

Often, the communication latency between vehicles 103 and localized servers 107 are less than the latency between vehicles 103 and central servers 101. Therefore, a localized server 107 often has the latest information about the region it is associated with and can quickly compute the lane, path, and route options. Since the lane and path computation is for a smaller geographical region, it is generally faster and hence can be provisioned to the vehicle 103 more quickly. In contrast, if the centralized server is bombarded with route computations by a multiplicity of vehicles all at the same time, it generally takes longer for the vehicles 103 to receive optimal route information.

Figure 5:
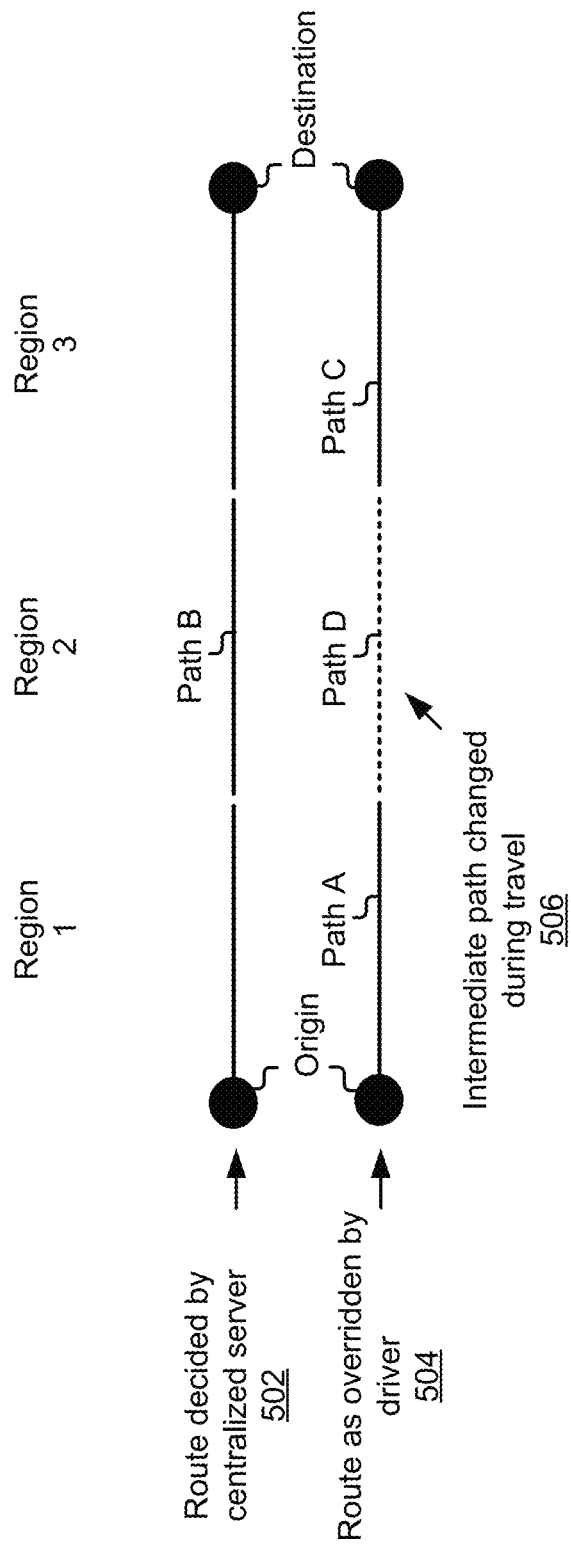
FIG. 5 is a diagram showing a localized server path decision overriding centralized server path.

FIG. 5 is a diagram showing a localized server 101 path decision overriding centralized server 101 path. As shown, initially a route may be selected that was provided by the centralized server 101 as reflected by reference numeral 502. Later, based on dynamic data processed by the localized server 107, a path change option was provided selected by the driver, resulting in an intermediate path being changed during travel as reflected by reference numeral 506.

In the example of FIG. 5, it is assumed that the centralized server has computed the route 502 for the vehicle 103 from the given origin to the destination. The route comprises path A, path B, path C in regions 1, 2, and 3 services by different localized servers 107. Along the way, there is a situation on the road which make path B less optimal. If the user has chosen the option where a localized server 107 can override the centralized server path, path D in region 2 is determined to be a better path for the vehicle 103 and can be used by the driver and/or automatically selected. This allows faster and better user experience.

The following further non-limiting example use cases are provided to illustrate when routes computed by the localized server 117 may be more optimal than routes computed by the centralized server 101:

Destination is minutes away and initial route contains few intersections (e.g., is within the region of a single localized server 107).

Road network is less congested.

Driver already prefers a certain route and needs suggestions only during emergencies or certain situations (like temporarily re-structured lanes, roadblocks, construction zones, etc.)

The following further non-limiting example use cases are provided to illustrate when routes computed by the centralized server 101 may be more optimal than routes computed by the localized server 107:

Destination is few hours away.

Road network is congested

Multiple drivers have heavily overlapped routes and routes have to optimized for all with better throughput In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
   receiving sensor data of a vehicle at a localized server associated with a particular geographic region that has one or more roadway segments, the localized server and the vehicle being located in the particular geographic region;
   analyzing, at the localized server, the sensor data to determine one or more of a localized lane option and a localized path option for navigating the vehicle;

providing the one or more of the localized lane option and the localized path option for navigating the vehicle to a centralized server executing a route planner, the centralized server having data covering a plurality of geographic regions and located remotely from the particular geographic region;
determining, at the centralized server, a centralized route option including the one or more of the localized lane option and the localized path option; and
providing the centralized route option including the one or more of the localized lane option and the localized path option to a guidance selector of a navigation application of the vehicle for processing.

2. The method of claim 1, wherein the centralized route option includes the localized lane option and the localized path option.

3. The method of claim 1, further comprising:
selecting at the vehicle to follow the centralized route option including the one or more of the localized lane option and the localized path option; and
providing turn-by-turn instructional guidance via the navigation application to a driver.

4. The method of claim 3, further comprising:
severing a connection between the localized server from the vehicle responsive to the vehicle leaving the particular geographic region;
establishing a connection between a second localized server and the vehicle responsive to the vehicle entering a region associated with the second localized server; and
determining, by the second localized server using a second set of sensor data received from the vehicle, a new path option for the centralized route option.

5. The method of claim 4, further comprising:
providing the new path option for the centralized route option for display in a graphical user interface;
receiving a selection to update the centralized route option to use the new path option; and
updating the centralized route option to use the new path option.

6. The method of claim 1, wherein the localized server is an edge server.

7. The method of claim 1, wherein the localized server is a roadside unit.

8. A method comprising:
receiving sensor data of a vehicle at a localized server associated with a particular geographic region that has one or more roadway segments, the localized server and the vehicle being located in the particular geographic region;
generating, at the localized server, one or more localized navigation routes using the sensor data of the vehicle;
generating, at a centralized server, one or more centralized navigation routes, the centralized server being distinct from the localized server and remotely located from the localized server and the particular geographic region;
providing the one or more localized navigation routes and the one or more centralized navigation routes to a guidance selector of a navigation application executing on board the vehicle; and
selecting, via the guidance selector, a particular route to follow.

9. The method of claim 8, further comprising:
providing the one or more localized navigation routes and the one or more centralized navigation routes for display in a graphical user interface;
receiving a selection to follow the particular route; and
providing turn-by-turn instructional guidance via the navigation application to a driver.

10. The method of claim 8, wherein the vehicle is an autonomous vehicle, and the method further comprises:
automatically determining that the particular route is a most efficient route to follow; and
controlling the vehicle using one or more actuators of the vehicle based on the particular route.

11. The method of claim 8, further comprising:
responsive to the vehicle leaving the particular geographic region, changing to a second localized server associated with a second geographic region distinct from the particular geographic region; and
determining, by the second localized server using a second set of sensor data received from the vehicle, a new path option.

12. The method of claim 11, further comprising:
providing the new path option for display in a graphical user interface;
receiving a selection to update the particular route to use the new path option; and
updating the particular route to use the new path option.

13. The method of claim 8, wherein the localized server is an edge server.

14. The method of claim 8, wherein the localized server is a roadside unit.

15. A system comprising:
one or more processors;
one or more memories storing instructions that, when executed by the one or more processors, cause the one or more processors to perform operations comprising:
receiving sensor data of a vehicle at a localized server associated with a particular geographic region that has one or more roadway segments, the localized server and the vehicle being located in the particular geographic region;
analyzing, at the localized server, the sensor data to determine one or more of a localized lane option and a localized path option for navigating the vehicle;
providing the one or more of the localized lane option and the localized path option for navigating the vehicle to a centralized server executing a route planner, the centralized server having data covering a plurality of geographic regions and located remotely from the particular geographic region;
determining, at the centralized server, a centralized route option including the one or more of the localized lane option and the localized path option; and
providing the centralized route option including the one or more of the localized lane option and the localized path option to a guidance selector of a navigation application of the vehicle for processing.

16. The system of claim 15, wherein the centralized route option includes the localized lane option and the localized path option.

17. The system of claim 15, wherein the operations further comprise:
selecting at the vehicle to follow the centralized route option including the one or more of the localized lane option and the localized path option; and
providing turn-by-turn instructional guidance via the navigation application to a driver.

18. The system of claim 17, wherein the operations further comprise:
severing a connection between the localized server from the vehicle responsive to the vehicle leaving the particular geographic region;

establishing a connection between a second localized server and the vehicle responsive to the vehicle entering a region associated with the second localized server; and determining, by the second localized server using a second set of sensor data received from the vehicle, a new path option for the centralized route option.

19. The system of claim 18, wherein the operations further comprise:

providing the new path option for the centralized route option for display in a graphical user interface;

receiving a selection to update the centralized route option to use the new path option; and updating the centralized route option to use the new path option.

20. The system of claim 15, wherein the localized server is an edge server.

* * * * *